United States Patent [19]

Bolto et al.

[11] 4,028,255

[45] June 7, 1977

[54] PREPARATION OF POLYMER COMPOSITES

[75] Inventors: Brian Alfred Bolto, Mitcham; Robert James Eldridge, Moorabbin, both of Australia

[73] Assignees: ICI Australia Limited; Commonwealth Scientific and Industrial Research Organization, both of Australia

[22] Filed: Oct. 6, 1975

[21] Appl. No.: 620,043

Related U.S. Application Data

[63] Continuation of Ser. No. 432,988, Jan. 14, 1974, abandoned.

[30] Foreign Application Priority Data

Jan. 31, 1973 Australia .......................... 2092/73

[52] U.S. Cl. ............................ 210/500 R; 210/75; 252/62.54
[51] Int. Cl.² .................... B01D 39/02; H01F 1/00
[58] Field of Search .................. 252/62.63, 62.54; 210/75, 500 R

[56] References Cited

UNITED STATES PATENTS

| | | | |
|---|---|---|---|
| 3,544,458 | 12/1970 | Masamichi et al. | 210/65 |
| 3,677,947 | 7/1972 | Ray et al. | 252/62.54 |
| 3,704,786 | 12/1972 | Lerner et al. | 210/290 |
| 3,764,539 | 10/1973 | Cochardt et al. | 252/62.63 |
| 3,890,224 | 6/1975 | Weiss et al. | 210/30 |
| 3,929,658 | 12/1975 | Beske | 252/62.54 |
| 3,977,984 | 8/1976 | Roberts | 252/62.54 |

*Primary Examiner*—F.C. Edmundson
*Attorney, Agent, or Firm*—Cushman, Darby & Cushman

[57] ABSTRACT

A method for the preparation of composite particles having a specified range of particle size and comprising a finely divided, magnetic, particulate material embedded in a matrix of a linear polymeric material, which method comprises the steps of:

a. forming discrete liquid droplets consisting of or containing the polymer, together with the particulate material;
b. causing or allowing the droplets to form into solid particles;
c. separating from the thus-formed particles those of the desired size range;
d. re-converting the remaining particles to liquid form; and
e. returning the re-liquified particles to step (a).

1 Claim, No Drawings

PREPARATION OF POLYMER COMPOSITES

This application is a continuation of application Ser. No. 432,988, now abandoned.

This invention is related to methods for the preparation of composite particles which consist essentially of a finely-divided, magnetic, particulate material embedded in a matrix of a polymeric material.

Composite particles consisting of finely divided magnetic material embedded in a polymer matrix are prepared for a variety of uses; the desired size and shape of the composite particles depending on the intended use. Some examples are ion-exchange resins containing magnetic iron oxide or other ferrites (as described in U.S. Pat. No. 3,560,878) and re-useable filter aids consisting of irregular granules of a hydrophilic polymer, also containing embedded magnetic material. Similar composites may be used as substrates for grafting ionogenic polymers, and porous composite particles may be used for removal of oil slicks from water. Methods of phase separation using magnetic polymer composites have also been proposed.

A problem associated with the preparation of such particles is that the usual preparation methods lead to products with a wide particle size range, whereas most of the uses call for narrow ranges of particle size. This can result in many such materials being economically unattractive because of the wastage involved in their preparation brought about by the necessity to discard under or oversized particles which are not recoverable. This invention is therefore concerned especially with the preparation of composite particles which are such as to allow materials with an undesirable particle size to be recycled.

Magnetic composite particles may be made by suspension polymerization, by evaporation of solvent from dispersed droplets of polymer solution containing suspended magnetic material, or by solidification of droplets of polymer melt containing the magnetic material. Other types of composite particles may be similarly prepared. The size and shape of the resulting particles can be controlled partially by controlling the rate of stirring and by adding surface active agents.

Generally, only a small fraction of the particles prepared by any of these methods will be of suitable size, shape, density or porosity for the intended use. For example, in ion-exchange procedures based on the use of magnetic resins, the smaller particles are desired because of their more rapid rate of adsorption of ions. In general, only particles of 250μ and smaller are employed. In another example, the use of magnetic polymers as filter aids is also restricted to the particle sizes which give optimum results. The preparation of such composite particles will therefore be made much more economical if rejected material can be re-used in a subsequent preparation.

Cross-linked polymers, which cannot be so recycled, are not well suited to the preparation of composite particles by the method of the invention. Moreover, cross-linked polymers tend to be brittle, and composite particles prepared from them may have an uneconomically short lifetime, due to mechanical attrition. Linear polymers, on the other hand, can be used in solution or in molten form, and rejected products can be re-melted or re-dissolved (the embedded particulate material passing into suspension) for recycling. Linear or branched polymers are commonly tough, and composite particles prepared from them have sufficient durability for use in the applications mentioned above.

According to the present invention there is provided a method for the preparation of composite particles having a narrow range of particle size and comprising between 30 and 90% w/w of a finely-divided, magnetic, particulate material embedded in a matrix of a linear polymeric material, which method comprises the steps of:

a. forming discrete liquid droplets consisting of or containing the polymer, together with the particulate material;
b. causing or allowing the droplets to form into solid particles;
c. separating from the thus-formed particles those of the desired narrow size range;
d. re-converting the remaining particles to liquid form; and
e. returning the re-liquified particles to step (a).

The term "liquid" is used herein to signify either the liquid form of the polymer itself or a solution of the polymer. As indicated above, the polymers for use in the invention must be either soluble and recoverable from an appropriate solvent, usually an organic solvent, or capable of being melted and re-melted without decomposition.

The desired narrow size range of the particles depends upon what the particles are to be used for. For example, particles suitable for use as filter aids have dimensions in the range 5–100 $\mu$m, and preferably 10–50 $\mu$m. Within the desired range the variation of particle sizes should be such that 90% w/w of the particles have a size within $\pm 10$ $\mu$M from the average size.

By the term magnetic we mean throughout this specification a ferro magnetic material. Suitable magnetic materials are ferrites or a material which exhibit reversible magnetism such as gamma-iron oxide, magnetite or chromium dioxide. The ferromagnetic material must obviously be of a particle size smaller than the polymer particles to be prepared. Suitable sizes are smaller than 5 $\mu$m and preferably smaller than 1 $\mu$m. Certain suitable ferrogmagnetic materials such as for example mill scale are very expensive to grind to the desired degree of fineness. Magnetic iron oxides, by contrast, are simple to prepare as fine powders and are therefore convenient to use where a reversible ferromagnetic polymeric material is required. The greater ease of dispersion of an unmagnetised, reversible ferromagnetic material, as compared to a hard ferrite which becomes magnetic when ground to the required degree of fineness, is advantageous when the material is to be incorporated within polymers.

Suitable polymers for the preparation of magnetic filter aids or other composite particles in accordance with the invention include natural, modified natural, or synthetic polymers which are insoluble in water, but are soluble in organic solvents or can be melted without decomposition. Examples are hydrocarbon polymers (e.g. polyethylene or polystyrene) vinyl halide, vinly ester, vinyl aldal or vinyl ether polymers (polyvinyl chloride, polyvinyl acetate, polyvinyl acetal or polyvinyl isobutyl ether), acrylic polymers (polyacrylonitrile, substituted polyacrylate esters), cellulose esterified or etherified to varying extents (cellulose acetate, methyl cellulose), polyesters, polyamides, polyurethanes, polyoxymethylene, and thermoplastic phenolformaldehyde and urea-formaldehyde resins. Copolymers (block, graft or random) of any of these materials may also be used.

In one preferred embodiment of the invention, preparation of composite particles is carried out by adding the particulate magnetic material to a previously prepared solution of the polymer, and dispersing the mixture so obtained in an immiscible liquid so as to form droplet of the polymer solution. Dispersion is maintained by stirring or other suitable means, while the mixture is heated to remove the solvent, thereby converting the dispersed droplets of solvent phase into solid composite particles. The solid composite particles are of use as filter aids.

There are many situations where it is required to remove very small amounts of finely divided, or gelatinous particulate matter such as clays and organic matter from for example, surface water supplies or from effluents from sewage treatment plants. One such situation relates to the desalination of water supplies by ion exchange processes utilising counter-current, reverse flow, regeneration procedures. The efficiency of such processes relies on the development of a concentration gradient within the bed which must not be destroyed between successive regeneration and adsorption cycles. Consequently back-washing of the bed, which is required to remove accumulated particulate matter, must be infrequent and prefiltration of the feed water is usually essential to reduce the rate of clogging of the ion exchange bed. When because of adverse kinetics as for example in the so-called Sirotherm process of water desalination using thermal regeneration of ion exchange resins, it is desirable also to operate an ion exchange fixed bed process with resins having the smallest possible particle size (e.g. 50 – 100 mesh as compared with the more usual 20–50 mesh standard resins) prefiltration is an essential requirement for successful operation to reduce clogging of the bed and distributors. One object of this invention is therefore to provide an improved prefiltration process for such applications. In other situations, for example, the treatment of raw sewage itself, the separation of hydrous metal hydroxides in hydrometallurgical operations or in chemical processing, the concentration of suspended solids is much higher.

In all these instances direct filtration of the suspension is often not practical as the result of rapid blinding of the pores of the filter medium by the finely divided or gelatinous material. One known procedure for increasing filtration rates in such situations is to first precoat the filter medium with a filter aid - i.e. a chemically inert solid having a low packing density (e.g. diatomaceous earth) before starting the filtration. In addition to forming a precoat it is also often advantageous to continue to add small amounts of filter aid to the feed so as to maintain the porosity of the accumulation of filter cake ("body feed" technique). The bed of particles provides an incompressible layer of high porosity and permits rapid filtration until the accumulation of particulates matter within the voids of the filter aid blocks the layer. When the concentration of suspended matter is very low (e.g. about 10 ppm), as in some water supplies, this technique is economically feasible even though the filter aid must be discarded along with the filter cake. However, when the concentration of suspended solids is high, the necessary discarding of the filter aid often makes the process uneconomic.

When proportions of magnetic particulate material in the lower end of the range are used in the procss of our invention the particles are roughly spherical in shape but have a rough or dimpled surface.

It is sometimes desirable to produce particles which are highly irregular in shape, for example when the particles are used as filter aids. The degree of irregularity may be influenced by changing the preparative conditions. More irregular-shaped particles are formed when the content of particulate material is raised, the irregular shape being produced when the solvent is stripped from the droplet, the polymer phase then shrinking down onto the particulate material. We prefer that in the preparation of irregular particles the content of magnetic particulate material is between 75 and 85% w/w of final solid composite particel.

The type and amount of solvent employed will also affect the shape of the final particle, as will the dispersing conditions employed.

For polymers soluble in polar solvents such as acetone or the lower alcohols, mineral oil is a suitable dispersion medium. Surfactants may be added to the dispersion to control the size and shape of the particles produced. The solvent may either be distilled from the mixture, or be stripped out below its boiling point in a current of air or other gas. The solvent may be recovered for re-use, and the dispersion medium may also be re-used.

In another embodiment, intimately mixed polymer and particulate magnetic material are dispersed in a suitable liquid (containing surfactant if required) at a temperature above the softening temperature of the polymer. Dispersion is maintained, e.g. by stirring, while the mixture is cooled and the dispersed droplets allowed to solidify. Alternatively, a polymer melt containing the particulate inorganic material may be injected into a liquid medium in such a way that droplets form and then solidify.

In each case, the fraction of the composite product having the desired particle size is separated, and the remainder may be broken down with solvent (or melted) and redispersed.

In accordance with a further aspect of the invention, composite particles may be prepared, for a given use, from polymers which initially do not possess all the desired properties for that use. Such properties can then be imparted by further treatment of the initial product after sizing. For example, composite filter aids prepared from hydrocarbon polymers by the method described above, can be made more hydrophilic by surface oxidation. Filter aids prepared from vinyl acetate copolymers can be made more hydrophilic by hydrolysis. Controlled cross-linking of polymer composites, after isolation of the desired size-range, may be required to achieve a suitable combination of mechanical properties, such as toughness and hardness, without the wastage associated with the use. of cross-linked polymers to form the composite in the first instance, as in the prior art.

The invention also includes composite particles when made by the methods described herein.

The invention will be further exemplified by reference to the following non-limiting examples.

EXAMPLE 1

10 g of a partially hydrolyzed copolymer of vinyl chloride and vinyl acetate was dissolved in 500 cm$^3$ of acetone. Crushed magnetite ($Fe_3O_4$) ore was screened and the finest fraction further subdivided using a hydrocyclone. The sub-fraction consisting predominantly of particles about 1 μm in diameter was dried and 40 g of the dried material added to the polymer solution. 1500 cm³ of paraffin oil containing one percent w/v of the anionic surfactant Aerosol TR* was then added and the whole warmed to 50° C while being continuously stirred with a propeller-type stirrer. A current of air was passed through the mixture until no acetone remained.

(* A product of the American Cyanamid Company, Wayne, New Jersey.)

The resulting solid particles were washed free of paraffin, dried and classified in the hydrocyclone. Fractions predominantly 5–20 μm (3.0g), 15–50 μm (6.2g) and 30–100 μm (39g) in size were isolated. Microscopic examination revealed the filter aid particles to be roughly spherical, but with surface irregularities. The $Fe_3O_4$ was dispersed throughout the polymer.

EXAMPLE 2

40 g of the polymer described in Example 1, 160 g of a synthetic $Fe_3O_4$ and 33.5 g of previously prepared filter aid particles containing these same two materials were added to 900 cm³ of acetone. This mixture was then dispersed using a paddle impeller, in 3000 cm³ of paraffin containing 0.2 percent of surfactant and the acetone removed as in example 1. Classification yielded 96 g of 10–30 μm irregular granules, 42 g of a 20–40 μm fraction, and 55 g of larger particles.

EXAMPLE 3

4 g of ethylcellulose was dissolved in 60 cm³ acetone and 4 g pf gamma-$Fe_2O_3$, 120 cm³ of paraffin and 2.2 cm³ of non-ionic surfactant (a mixture of Span 85 and Tween 85*) added. This mixture was homogenized at 16000 rpm, then warmed to 50° C and stirred continuously while the solvent was removed in a current of air.

(*"Span" and "Tween" are products of ICI Australia Ltd).

EXAMPLE 4

1.0 g of phenol-formaldehyde novolac was dissolved in 12.5 cm³ of acetone and 4.0 g of synthetic $Fe_3O_4$, and added. This mixture was stirred, warmed to 50° C and the acetone removed as in example 1.

EXAMPLE 5

The product of Example 1 was tested as a magnetic filter aid as follows:

The particles were slurried with water, magnetized at about 600 Gauss and applied to the filter septum. This consisted of a disc of synthetic fabric supported in a Buchner funnel 5.5 cm in diameter. The septum was coated with a bed of the particles approximately 2.4 mm deep. A standard clay-in-water suspension having a turbidity of about fifty Jackson units was then pumped into the Buchner funnel at a rate of about 220 cm³ min⁻¹ ( ≡ 2 gallon $f\,t^{-2}$ min⁻¹) and drawn through the filter bed under suction. The turbidity of the filtrate was monitored at intervals until the run was ended by either of the following conditions:

i. the turbidity $\tau$ of the filtrate approached that of the unfluent $\tau_0$.
 ii. the filter became incapable of maintaining the desired flow-rate.

The 15–50 μ fraction of Example 1, yielded a filtrate having a turbidity initially about 0.25 $\tau_0$, rising to about 0.55 $_0$ after the passage of 1300 bed volumes, when condition (ii) applied. The 30–100 μ fraction gave product turbidities ranging from 0.33 $\tau_0$ initially to 0.8 $\tau_0$ after 1000 bed volumes.

By comparison, a bed of Celite 545 of similar depth did not reduce $\tau$ below 0.5–0.6 $\tau_0$, and after 1000 bed volumes had been filtered, had risen to about 0.9 $\tau_0$.

EXAMPLE 6

Example 2 was repeated except that the 33.5 g of previously prepared filter aid particles were obtained from the unwanted 20–40 μm and larger fractions obtained in example 2. On classification a similar product to example 2 was obtained. The unwanted size ranges were again used as the previously prepared filter aid particles in a further experiment according to example 2 to obtain substantially similar results.

We claim:

1. Filter aid comprising composite particles having an average size of particle in the range from 5 to 10 μm with at least 90% w/w of the particles having a size within 10 μm of the average size and from 75% to 85% w/w of each particle comprising a magnetic particulate material of size less than 5 μm embedded in a matrix of a thermoplastic linear polymeric material.

* * * * *